United States Patent
Mouri et al.

[11] 3,818,401
[45] June 18, 1974

[54] DISPLACEMENT ELECTRIC SIGNAL CONVERTER

[75] Inventors: Mineju Mouri; Katsuhiko Aoki, both of Kawasaki, Japan

[73] Assignee: Fuji Electric Company Limited, Kawasaki-shi, Kanagawa, Japan

[22] Filed: Apr. 12, 1973

[21] Appl. No.: 350,577

[30] Foreign Application Priority Data
Apr. 12, 1972 Japan................. 47-36666

[52] U.S. Cl.................. 336/87, 336/120
[51] Int. Cl............................ H01f 21/00
[58] Field of Search....... 336/84, 87, 117, 118, 119, 336/120, 122, 123, 124, 125, 131, 132, 121, 135

[56] References Cited
UNITED STATES PATENTS

| | | |
|---|---|---|
| 705,482 | 7/1902 | Thiermann............... 336/131 X |
| 3,192,495 | 6/1965 | Brodersen................ 336/135 |
| 3,214,717 | 10/1965 | Brodersen............... 336/120 X |

*Primary Examiner*—Thomas J. Kozma
*Attorney, Agent, or Firm*—Sughrue, Rothwell, Mion, Zinn & Macpeak

[57] ABSTRACT

A displacement-electric signal converter is composed of two annular magnetic bodies coaxially disposed, a magnetizing coil provided in an air gap formed between the two annular magnetic bodies, and a detecting coil provided on one of the two magnetic bodies so that the detecting coil is rotatable around the common axis of the two magnetic bodies, said magnetizing coil is energized from an a.c. voltage source, said detecting coil is rotated in accordance with an angular displacement to be measured, whereby an electric signal corresponding to the angular displacement to be measured is obtained from the detecting coil.

7 Claims, 13 Drawing Figures

FIG. I(A)
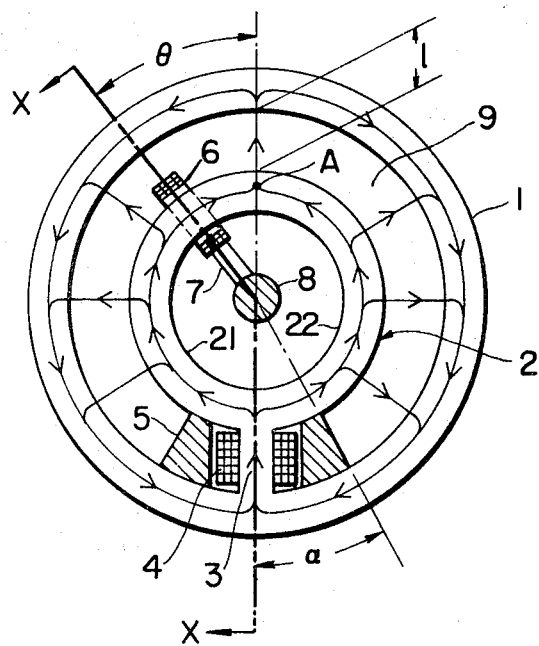
FIG. I(B)
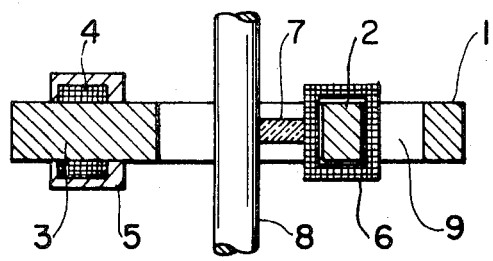

• --- THEORETICAL VALUE
× --- MEASURED VALUE

DISPLACEMENT ELECTRIC SIGNAL CONVERTER

BACKGROUND OF THE INVENTION

This invention relates to a displacement-electric signal converter whereby an angular displacement variable in a wide range can be converted into an electric signal.

Known is a displacement-electric signal converter comprising a detecting coil wound around an annular magnetic body throughout the entire circumference thereof thereby forming a stator, the winding direction of one half of the detecting coil being opposite to the winding direction of the other half of the detecting coil, and a bar magnet having an exciting coil wound on the bar magnet thereby acting as a rotor disposed internally of the stator, said exciting coil being energized from an a.c. voltage source, whereby when the rotor is rotated in accordance with an angular displacement to be measured, an electric signal corresponding to the angular displacement can be obtained from the detecting coil wound around the stator.

However, such a displacement-electric signal converter has drawbacks in that an angular displacement exceeding 180° can not be theoretically converted into an electric signal and that the detecting coil must be wound around the entire circumference of the magnetic body very accurately if a converter of normal precision is desired to be obtained.

SUMMARY OF THE INVENTION

Therefore, a primary object of the present invention is to provide an improved displacement-electric signal converter wherein all of the above described drawbacks of the conventional converter can be substantially eliminated.

Another object of the invention is to provide an improved displacement-electric signal converter which is simple in construction and low cost in manufacture.

Still another object of the invention is to provide an improved displacement-electric signal converter wherein an angular displacement in a range of entire 360° can be theoretically converted into an electric signal.

An additional object of the invention is to provide an improved displacement-electric signal converter wherein no precision winding is required along the annular magnetic body.

The above described and other objects of the present invention can be achieved by an improved displacement-electric signal converter, which comprises two annular magnetic bodies disposed coaxially with each other, a magnetizing coil disposed in an air gap formed between the two annular magnetic bodies, the magnetizing coil being energized from an a.c. power source, a coil means for detecting magnetic fluxes passing through one of the two annular magnetic bodies, means for fixing either one of the exciting coil and the coil for detecting magnetic fluxes, and means for rotating the other one around the common axis of the two annular magnetic bodies for an angle according to a displacement to be measured, whereby an electric signal corresponding to the displacement can be obtained from the coil means for detecting the magnetic fluxes.

The nature, principle, and utility of the invention will be more clearly understood from the following detailed description of the invention when read in conjunction with the accompanying drawings wherein like parts are designated by like reference numerals.

BRIEF DESCRIPTION OF THE DRAWINGS

In the drawings:

FIGS. 1 and 2 are views showing different examples of displacement-electric signal converters constituting a first and a second embodiment of the present invention, wherein A represents plan views, and B represents elevational views, partly in section, taken along the line X—X in each plan views;

DETAILED DESCRIPTION OF THE INVENTION

Figure 2A:
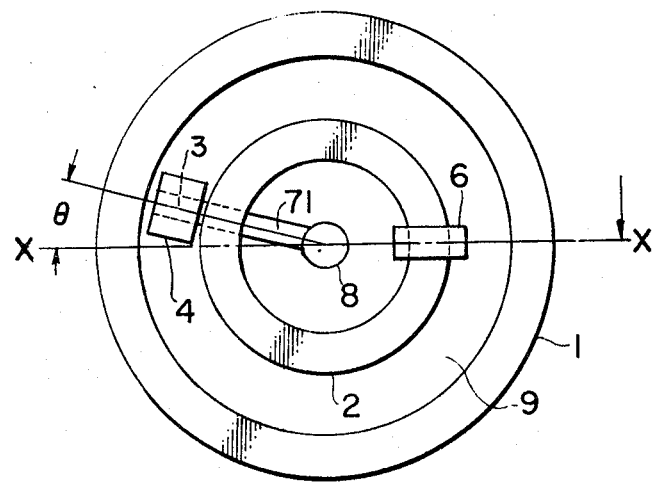

Referring to FIG. 1, there is indicated a displacement-electric signal converter constituting a first embodiment of the invention, wherein two annular magnetic bodies 1 and 2 are disposed concentrically around a central shaft 8 which is rotated in correspondence to an angular displacement to be measured. The annular magnetic bodies 1 and 2 are connected together through a yoke 3 provided at one angular position of the magnetic bodies. The magnetic bodies 1 and 2 are made of, for instance, laminated core plates, ferrite, or dust core consisting of powdered magnetic material solidifed by a synthetic resin, and the rotatable shaft 8 is made of a non-magnetic material. On the yoke 3, there is wound a magnetizing coil 4 of $N_1$ turns which is connected to an a.c. power source (not shown). The magnetizing coil 4 is covered by a shielding plate 5. On the annular magnetic body 2, there is wound a detecting coil 6 of $N_2$ turns in such a manner that the detecting coil 6 can be displaced around the magnetic body 2. The detecting coil 6 is rigidly coupled to the rotatable shaft 8 through an arm 7. By this construction, the detecting coil 6 is rotated around the annular magnetic body 2 in correspondence with the angular displacement to be measured. The arm 7 is made of a non-magnetic material.

The operation of this embodiment of the invention will now be described.

When an a.c. voltage $E_1$ (V) is applied to the magnetizing coil 4, a magnetizing current $I_1$ (A) flows through the magnetizing coil 4, thus creating magnetic fluxes passing through the magnetic bodies and else. The total number of the magnetic fluxes $\Phi$ can be expressed as follows.

$$\Phi = N_1 I_1 / R \quad (1)$$

wherein, $\Phi$ is expressed in (wb), and R represents a reluctance of the magnetic circuit consisting of the yoke 3, the annular magnetic bodies 1 and 2, and an annular air gap 9 formed between the two magnetic bodies 1 and 2. The magnetic fluxes flow from the magnetic body 2 to the magnetic body 1 in the air gap 9, and from the magnetic body 1 to the magnetic body 2 in the yoke 3.

In the case where the following conditions (1) and (2) are satisfied in this embodiment, the distribution of the magnetic fluxes in the air gap 9 can be equalized.

1. The annular magnetic bodies 1 and 2 are made of a uniform magnetic substance having an extremely high specific permeability $\mu_s$.
2. The radial space $l$ of the air gap 9 between the annular magnetic bodies 1 and 2 expressed in ($m$) is uniform throughout its circumference, and the radial cross-sectional areas of the annular magnetic bodies 1 and 2 are uniform throughout their annuli.

When the specific permeability of the magnetic bodies 1 and 2 is extremely high, the reluctance of the annular magnetic bodies 1 and 2 can be neglected in comparison with the reluctance of the air gap 9. Accordingly, the reluctance R in equation (1) is mostly determined by the reluctance of the air gap 9. Since the two magnetic bodies 1 and 2 are arranged concentrically, the radial distance $l$ of the air gap 9 is equally distributed throughout its entire circular configuration, and furthermore, an effective cross-sectional area of the magnetic path through the air gap 9 is also uniform throughout the circumference. Thus, the reluctance of the air gap is made uniform throughout its annular range, and the magnetic fluxes are distributed uniformly in the air gap 9.

Assuming that an angular range occupied by the magnetic shielding plate 5 is $2\alpha$ and leakage magnetic fluxes in this range is negligible, magnetic fluxes $\phi$ ($wb$/rad) per unit angle in the air gap 9, in which magnetic fluxes are distributed uniformly, can be expressed as follows.

$$\phi = \Phi/2(\pi - \alpha) \tag{2}$$

In other words, the magnetic fluxes $\Phi$ caused by the excitation of the magnetizing coil 4 are divided into two parts flowing respectively through two paths 21 and 22 formed in two halves of the annular magnetic body 2. The magnetic fluxes flowing the paths 21 and 22 are constantly reduced their number because of leakage fluxes constantly distributed at a rate of $\phi$ per a unit angle until the number of magnetic fluxes is ultimately reduced to zero at a point A.

Thus, the number of magnetic fluxes $\phi_{N2}$ interlinking with the detecting coil 6 placed at an angular position $\theta$ from the point A is expressed as $$\phi_{N2} = \phi \cdot \theta \tag{3}$$

and a voltage $E_2$ (V) induced in the detecting coil 6 is expressed as $$E_2 = N_2 \cdot d\phi_{N2}/dt \tag{4}$$

The equation (4) can be transformed based on the equations (2) and (3) into the following equation (5).

$$E_2 = \theta/2(\pi - \alpha) \cdot N_2 \cdot d\Phi/dt \tag{5}$$

Assuming that the entire magnetic fluxes $\Phi$ are interlinking with the magnetizing coil 4 wound on the yoke 3, a relation $$N_1 \Phi = L I_1 \tag{6}$$

is satisfied, wherein L is a self-inductance of the magnetizing coil 4.

When the resistance portion $r$ (ohms) and the reactance portion $\omega L$ (ohms) of the a.c. impedance of the magnetizing coil 4 satisfy a relation $$\omega L \gg r \tag{7}$$

then $$E_1 = L \, dI_1/dt \tag{8}$$

Accordingly, the equation (5) can be transformed into the following equation, $$E_2 = \theta/2(\pi - \alpha) \cdot N_2/N_1 \cdot E_1$$
$$= k \, \theta \tag{9}$$

wherein $$K = E_1/2(\pi - \alpha) \cdot N_2/N_1$$

From the above equation, it will be apparent that an a.c. voltage $E_2$ proportional to a rotating angle $\theta$ of the shaft 8 can be obtained from the detecting coil 6.

Figure 2B:
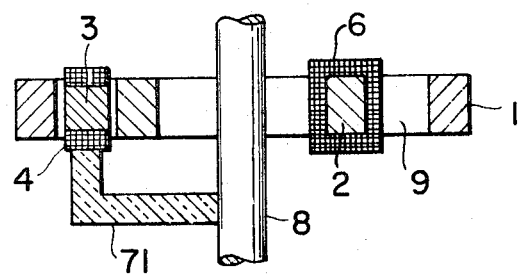

In FIG. 2, there is indicated a second embodiment of the invention wherein two annular magnetic bodies 1 and 2 are arranged concentrically so that the magnetic body 2 is disposed inside of the magnetic body 1. In this embodiment, a detecting coil 6 is stationarily wound around the annular magnetic body 2, and a yoke 3 is freely movably disposed in an air gap 9 formed between the two annular magnetic bodies 1 and 2. On the yoke 3, a magnetizing coil 4 is wound around, and the yoke 3 is mechanically coupled with a rotating shaft 8 at the center of the magnetic bodies 1 and 2 through an arm 71. In this embodiment, the magnetizing coil 4 on the yoke 3 is rotated around the shaft 8 in correspondence with an angular displacement to be measured, and an a.c. voltage representing the angular displacement is obtained from the detecting coil 6.

Figure 3:
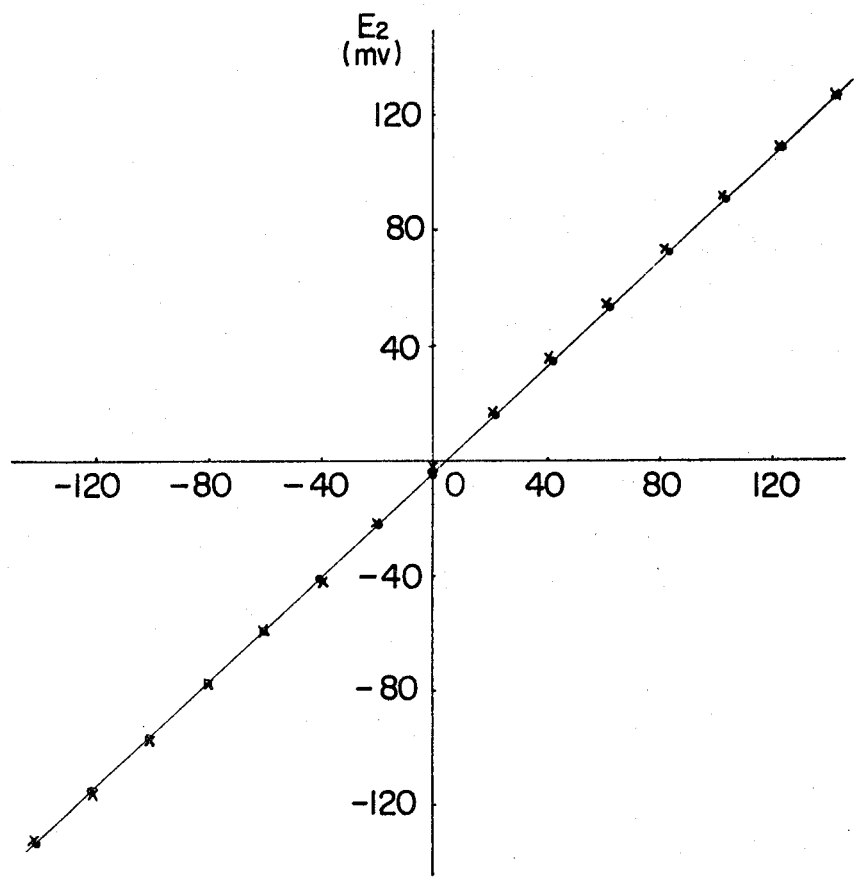
FIG. 3 is a graphical representation of a conversion characteristic of an embodiment shown in FIG. 2.

In FIG. 3, there is indicated an experimental result showing the relation between an angular displacement $\theta$ and an a.c. voltage $E_2$ obtained from the detecting coil 6, and in Table 1, numerical data supporting the relation are indicated. In this experiment, values of the constants appearing in the coefficient K in the equation (9) were selected as follows.

$$N_1 = 200 \text{ (T)}, N_2 = 80 \text{ (T)}, E_1 = 0.9 \text{ (V)}, \text{ and}$$
$$\alpha = 0$$

whereby $$K = E_1/2(\pi - \alpha) \cdot N_2/N_1 = 0.9 \text{ (V)}/2\pi \cdot 80 \text{ (T)}/200 \text{ (T)}$$
$$= 0.18/\pi \text{ (V/rad)}$$

Furthermore, error ratio (percent) in Table 1 indicates percent error ratios between error and a span voltage 260.11 (a sum of voltage corresponding to $-140°$ and $+140°$ constituting an entire measuring range of this embodiment. Herein a theoretical span voltage is 0.279 (V).

Table 1

| θ in degree | $E_2$ (mV) measured | $E_2$ (mV) Theoretical | Error | % Error |
| --- | --- | --- | --- | --- |
| −140 | −133.40 | −133.40 | 0.00 | 0.00 |
| −120 | −115.67 | −114.82 | −0.85 | −0.33 |
| −100 | −97.13 | −96.24 | −0.89 | −0.34 |
| −80 | −78.88 | −77.66 | −1.22 | −0.47 |
| −60 | −59.85 | −59.08 | −0.77 | −0.29 |
| −40 | −40.49 | −40.50 | −0.01 | −0.01 |
| −20 | −21.25 | −21.92 | −0.67 | −0.26 |
| 0 | −2.19 | −3.35 | 1.16 | 0.44 |
| 20 | 17.19 | 15.23 | 1.97 | 0.76 |
| 40 | 36.47 | 33.81 | 2.66 | 1.02 |
| 60 | 55.00 | 52.39 | 2.61 | 1.00 |
| 80 | 73.34 | 70.97 | 2.37 | 0.91 |
| 100 | 92.45 | 89.56 | 2.90 | 1.11 |
| 120 | 109.77 | 108.81 | 1.64 | 0.63 |
| 140 | 126.71 | 126.71 | 0.00 | 0.00 |

In the examples shown in FIGS. 1 and 2, uniform distribution of the magnetic field in the air gap is obtained by arranging the two annular magnetic bodies made of a material having a great specific permeability of magnetism in a concentric manner. According to our experiments, in this case the specific magnetic permeability must be in a range of $\mu_s \geqq 4,000$ (for the case of a laminated core). Because of the existence of an air gap in the magnetic circuit, the self-inductance L of the magnetic coil 4 cannot be sufficiently great to satisfy the relation (7) unless the frequency $f$ of the a.c. voltage is raised so that a greater value of $\omega = 2\pi f$ is obtained. However, if the frequency $f$ is raised to such a high value, many kinds of material will not satisfy the relation of $\mu_s \geqq 4,000$.

Because of the above described reason, when a uniform distribution of magnetic fluxes is desired in the air gap, it is recommended that the annular magnetic bodies 1 and 2 are arranged as follows.

Figure 4:
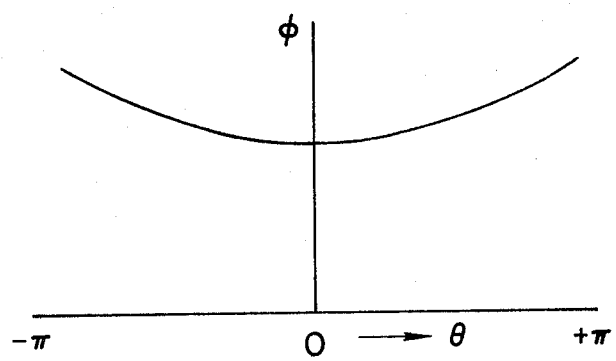
FIGS. 4 and 5 are diagrams to be used for the explanation of the embodiment shown in FIGS. 1 and 2.
Figure 5:
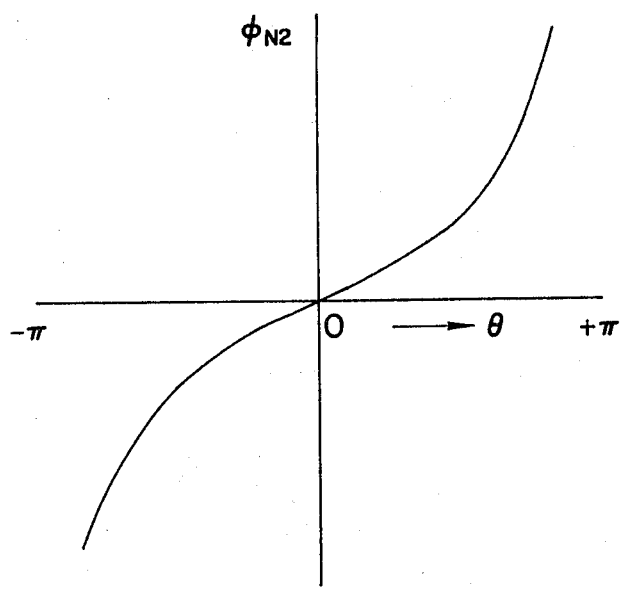

In the case where the specific magnetic permeability $\mu_s$ is comparatively low, the magnetic reluctances of the magnetic bodies 1 and 2 cannot be neglected in comparison with that of the air gap 9. Thus the distribution of the magnetic fluxes in the air gap 9 in the construction shown in FIG. 1 is varied as shown in FIG. 4, and the magnetic fluxes $\phi_{N2}$ interlinking with the detecting coil 6 is varied as shown in FIG. 5. Accordingly, an induced voltage $E_2$ in the detecting coil 6 cannot any more be linearly proportional to the displacement angle $\theta$. However, as is apparent from FIG. 4, leakage magnetic fluxes $\phi$ per unit angle found in the air gap 9 become greater in accordance with the measured position getting nearer to the magnetizing coil 4. From this fact, it is understood that the distribution of magnetic fluxes in the air gap 9 will be substantially uniform when the length $l$ in a radial direction is increased constantly from a minimum value at a point A on the center line to a maximum value at a point adjacent to the magnetizing coil 4. Thus, in the particular application, the annular magnetic body 2 is slightly shifted radially toward the point A.

Figure 6A:
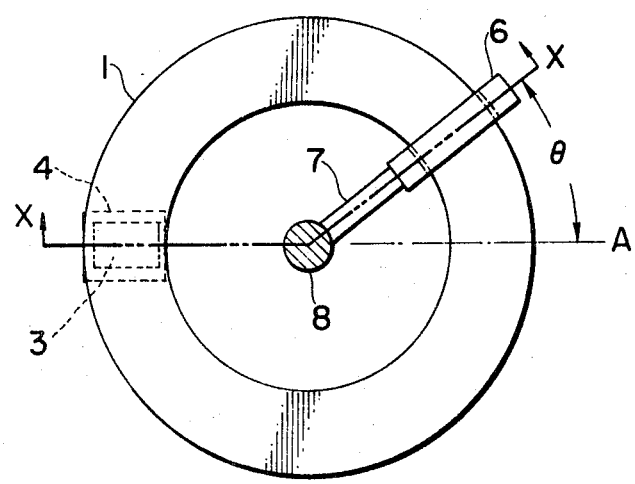
FIGS. 6, 7 and 8 are views showing still different examples of displacement-electric signal converters constituting a third and fourth embodiments of the invention, wherein A represents plan views, and B represents elevational views, partly in section, taken along the lines X—X in plan views.
Figure 6B:
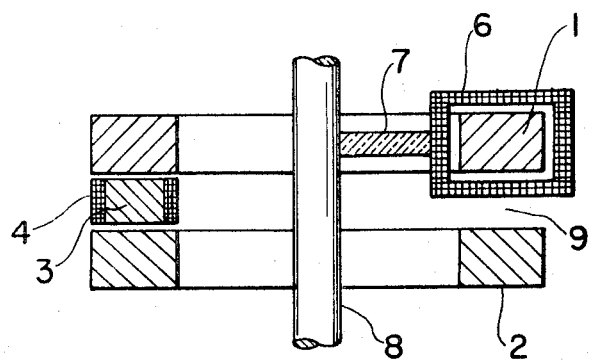

In FIG. 6, there is indicated still another embodiment of the present invention wherein two annular magnetic bodies 1 and 2 are arranged substantially coaxially in an up-and-down relationship. The annular magnetic bodies 1 and 2 are made of ferrite, laminated core plates, or the like as described in the embodiment shown in FIG. 1, and in this embodiment, the two magnetic bodies 1 and 2 are formed to be an equal size. In the air gap 9 between the two magnetic bodies 1 and 2, a yoke 3 is provided, and a magnetizing coil 4 is wound around the yoke 3. A detecting coil 6 is provided to be freely movable around the surface of the magnetic body 1 in a similar manner as in the embodiment shown in FIG. 1. This detecting coil 6 is mechanically coupled with a central shaft 8 through an arm 7. This embodiment can be operated based on an electromagnetic principle similar to that applied to the first embodiment shown in FIG. 1.

Figure 7A:
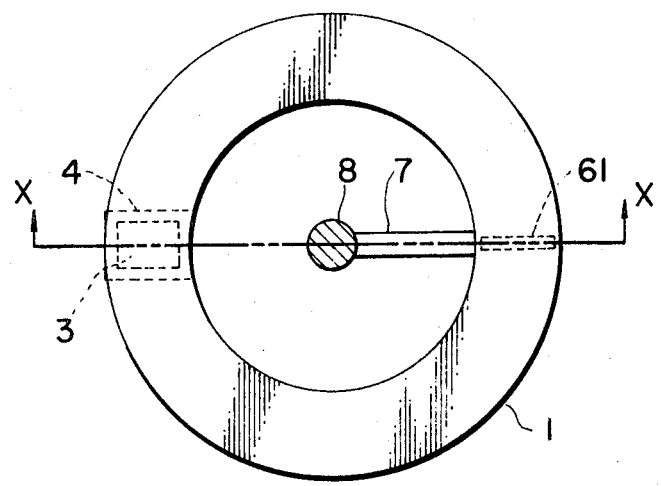
Figure 7B:
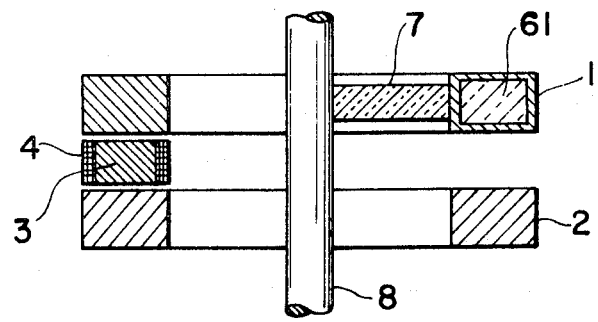

In FIG. 7, there is indicated an additional embodiment of the present invention wherein two annular magnetic bodies 1 and 2 are arranged in a similar manner as in the embodiment of FIG. 6. However, the annular magnetic body 1 is coupled through an arm 7 to a central rotatable shaft 8, and a magneto-electric transducer such as a magneto-resistance element 61 is buried in the annular magnetic body 1. Any variation in the magnetic fluxes in the annular magnetic body 1 is detected as a variation in the resistance value of the magneto-resistance element 61. Utilizing the feature of this embodiment, a rotating angle of the central shaft 8 can be determined by measuring the variation in the resistance value of the magneto-resistance element 61. Instead of the magneto-resistance element, a Hall unit may also be employed in the magnetic body 1 for detecting the magnetic fluxes therein.

Figure 8A:
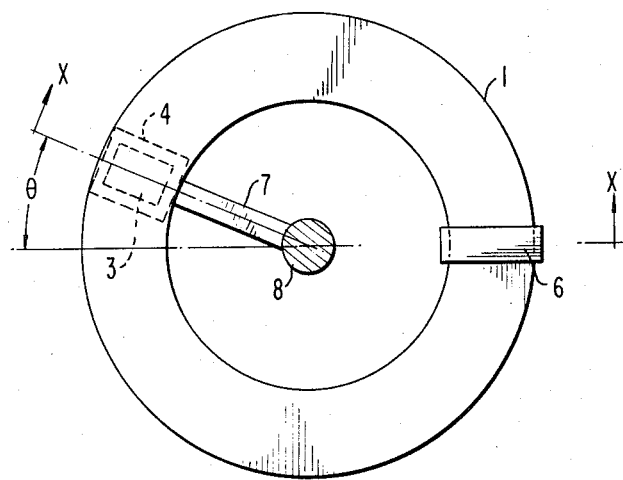
Figure 8B:
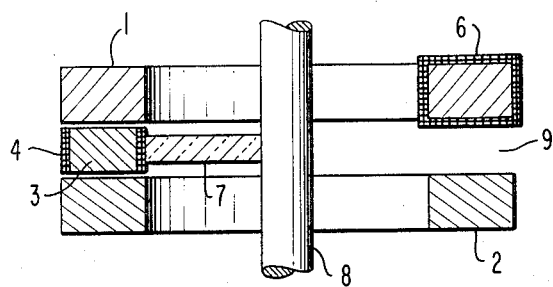

In FIG. 8 there is indicated a further embodiment of the present invention wherein a yoke 3 wound by magnetizing coil 4 is mechanically coupled with a rotatable shaft 8 through arm 7, and detecting coil 6 is fixedly wound to an annular body. In this embodiment, which is similar to the embodiment shown in FIGS. 2(A) and 2(B), the magnetizing coil 4 in air gap 9 is rotated in correspondence with a displacement to be measured, whereby an output electric signal is obtained from detecting element 6. This embodiment can be operated based on an electromagnetic principle similar to that shown in FIG. 1.

Moreover, in the embodiments shown in FIG. 2 and in FIGS. 6–8, the magnetizing coil 4 may also be covered with a magnetic shielding plate 5, as shown in FIG. 1. But in case the linearity is held, the shielding plate may be omitted.

As will be apparent from all of the above description, an angular displacement within 360° range can be converted into an electrical signal by the use of a displacement-electric signal converter according to the present invention, and the construction of the converter is much simplified because there is no necessity of winding wire around the entire circumference of the annular magnetic body.

We claim:
1. A displacement-electric signal converter comprising two annular magnetic bodies arranged coaxially around a rotatable shaft, a yoke disposed in an air gap between said annular bodies, said yoke having a magnetizing coil surrounded by a shield plate, said two annular magnetic bodies and said yoke forming a magnetic circuit, and at least a detecting element provided on one of said two annular magnetic bodies for detecting magnetic fluxes passing through the annular magnetic body, only one of said detecting element and said magnetizing coil being fixed and the other being ro- tated in correspondence with a displacement to be measured, whereby an output electric signal is obtained from said detecting element.

2. A displacement-electric signal converter as set forth in claim 1 wherein said two annular magnetic bodies are of different diameters from each other and arranged concentrically on a horizontal plane around said rotatable shaft.

3. A displacement-electric signal converter as set forth in claim 1 wherein said two annular magnetic bodies are of an equal diameter and arranged coaxially in an overlying relation one above the other.

4. A displacement electric signal converter as set forth in claim 3, wherein the yoke with said magnetizing coil is disposed so as to be fixed in the air gap and is mechanically coupled with said two annular magnetic bodies, said detecting element being rotated around the rotatable shaft with a displacement to be measured.

5. A displacement-electric signal converter as set forth in claim 3, wherein said detecting element is disposed so as to be fixed to one of said two annular magnetic bodies, the yoke with said magnetizing coil being rotated around the rotatable shaft in correspondence with a displacement to be measured.

6. A displacement-electric signal converter as set forth in claim 2, wherein the yoke with said magnetizing coil is disposed so as to be fixed in the air gap and is mechanically coupled with said two annular magnetic bodies, said detecting element being rotated around the rotatable shaft in correspondence with a displacement to be measured.

7. A displacement-electric signal converter as set forth in claim 2, wherein said detecting element is disposed so as to be fixed to one of said two annular magnetic bodies, the yoke with said magnetizing coil being rotated around the rotatable shaft in correspondence with a displacement to be measured.

* * * * *